United States Patent

Cavallerano et al.

[11] Patent Number: 6,163,308
[45] Date of Patent: Dec. 19, 2000

[54] METHOD AND APPARATUS FOR MINIMIZING VISUAL ARTIFACTS CAUSED BY THE PIXEL DISPLAY OF A VIDEO IMAGE

[75] Inventors: Alan P. Cavallerano; Claudio Ciacci, both of White Plains, N.Y.

[73] Assignee: Philips Electronics North America Corporation, New York, N.Y.

[21] Appl. No.: 08/907,593

[22] Filed: Aug. 8, 1997

[51] Int. Cl.[7] ........................................................ G09G 5/00
[52] U.S. Cl. ................................... 345/4; 345/32; 345/87
[58] Field of Search .................................. 345/87, 7, 8, 9, 345/4.5, 6, 30, 32; 349/57, 104, 109, 112, 118; 353/31, 38, 84; 348/580

[56] References Cited

U.S. PATENT DOCUMENTS

| | | | |
|---|---|---|---|
| 4,432,009 | 2/1984 | Reitmeier et al. | 348/580 |
| 5,737,042 | 4/1998 | Shinohara et al. | 349/57 |
| 5,755,501 | 5/1998 | Shinohara et al. | 353/31 |
| 5,825,337 | 10/1998 | Viseman et al. | 345/4 |
| 5,872,654 | 2/1999 | Shirochi | 345/32 |

*Primary Examiner*—Xiao Wu
*Attorney, Agent, or Firm*—Edward W. Goodman'

[57] ABSTRACT

A display or projection of an image as an array of pixels is, effectively, a sampling process, and pre- and post-filtering must be applied to avoid aliasing and to properly reconstruct the image. Because the sampling is performed by the display/projection of the pixels forming the image, the pre-filtering must be applied to the video signal before it is formed into pixels, and the post-filtering must be applied, optically, after the pixels are formed. The pre-filtering process can also compensate for the non-uniform characteristics of the display or the post-filtering process. As such, the occurrence and severity of visual artifacts introduced into the display or projection of an image are reduced.

13 Claims, 9 Drawing Sheets

METHOD AND APPARATUS FOR MINIMIZING VISUAL ARTIFACTS CAUSED BY THE PIXEL DISPLAY OF A VIDEO IMAGE

BACKGROUND OF THE INVENTION

1. Field of the Invention

This invention addresses the filtering of a video signal within a video display or projection device to minimize the visual artifacts produced by the display or projection of an image as a set of pixels. This invention addresses the prefiltering of video signals for a pixel based display or projection device, and the optical postfiltering of the image produced by the display or projection device. A pixel based display or projection device is a device wherein the image is present as an array of discrete picture elements, or pixels. Such displays and projectors are currently used for color television, computer devices, and LCD displays, and their use will continue to increase as flat panel screens and high definition television (HDTV) becomes increasingly prevalent.

2. Discussion of the Relevant Arts

Conventional television video images are produced by sweeping an electronic beam across the screen horizontally, then moving the beam vertically, and sweeping the beam again across the screen horizontally. During this horizontal sweep, the beam is appropriately modulated to produce an image corresponding to the video image to be displayed across this horizontal line. Similar techniques are employed for projecting an image; for ease of language, the term display will be used herein to include both the creation of the image upon the surface of the display device, as well as the creation of the image by the projection of light from the device to another surface.

The display of color images requires a partitioning of the display into discrete "picture elements", or "pixels". Conventionally, each pixel on a color display consists of a triad of red, green, and blue areas, configured as either dots or bands. Three individual electron beams are swept across the screen, appropriately modulated to excite the corresponding red, green, and blue areas to produce the desired image. The resolution of the screen, i.e., the ability to display detail, is determined by the number of individual pixel elements, because any detail occurring between the spacing of the individual pixel elements will not be displayed. That is, the displayed video image is, effectively, a display of the original image as it appears at each pixel element, rather than a continuous display of the original image. As disclosed herein, this partitioning of an image into individual picture elements is, effectively, a sampling of the video image.

In other devices, such as Liquid Crystal Displays (LCDs), plasma displays, etc., this pixel-sampling of the image to be displayed is explicit, and the effects are more severe. These devices have individually addressable picture elements. The luminance of each picture element is set proportional to a sample of the luminance of the image to be displayed corresponding to the location of this picture element. If the display is a color display, the luminance of each color in the picture element is set accordingly. The resolution of such displays is determined by the number of individually addressable elements comprising the display.

Two problems are introduced by this sampling phenomenon:

if the resolution of the display is insufficient, low frequency visual artifacts will be introduced; and, if the discrete samples are not appropriately filtered, high frequency visual artifacts will be produced.

In addition to being visually disturbing, the introduction of visual artifacts which are not present in the original image may have severe consequences in such applications as medical image processing, because the image will show artifacts which are not really present in the item being examined.

It is well known in the art that the information to be displayed must be bandwidth limited so as not to exceed the capabilities of the communications channel across which the information travels. Anti-aliasing filters are conventionally applied to the video image before it is encoded for transmission, and reconstruction filters are employed in the receiver to accurately reproduce this filtered video image. This anti-alias filtering and reconstruction, however, is conventionally applied without regard to the capabilities of the specific device upon which the image is to be created. In conventional displays, signals which exceed the device's ability to be displayed are merely suppressed by the device's insufficient sampling. For example, a common computer video format is 1024 pixels per horizontal line, and conventional monitors are available with 0.28 mm and 0.39 mm dot pitch. A 0.28 mm dot pitch is approximately equivalent to 90 pixels per inch; a 0.39 mm dot pitch is approximately equivalent to 65 pixels per inch. A 15" monitor's width is about 12 inches, which equates to 1080 pixels per horizontal line for a 0.28 mm pitch display, but only 780 pixels per horizontal line for a 0.39 mm pitch display. Images of 1000 pixels per line, however, are typically communicated to such 780 pixel per line displays. Attempting to display the 1000 pixels to a 12 inch, 0.39 mm dot pitch, display will not only result in a loss of resolution, but, more significantly, as disclosed herein, will result in the introduction of signals not present in the original image. That is, absent this invention, if the display has insufficient resolution, not only is the finer detail lost, as expected, but new features, or artifacts, will be introduced into the displayed image.

Even with a display having sufficient resolution to display the finer detail, the discrete display of individual pixel elements, with discontinuities between adjacent pixels, introduces high frequency harmonics which are also not present in the original image. As disclosed herein, the display of an image on a pixel based display is, effectively, a sampling process, yet conventional displays do not contain the reconstructive filters necessary to accurately reproduce the original image. For example, it is known that an image having fine detail, equivalent to about 500 cycles of changes per horizontal line can be displayed on a monitor having over 1000 pixels per horizontal line. However, the actual image will typically be continuous, whereas the displayed image is composed of discrete samples of this image. A common prior art technique for reducing the visual interference caused by the display of discrete elements is to purposely "blur" the image, so that the edge between pixels becomes less visible. Another technique for improving pixel images is dithering, wherein a pixel's content is affected by a purposeful spill-over from adjacent pixels, also with the intent of blurring the edges between pixels. Each of these techniques, however, operate by distorting the image, rather than by a purposeful reconstructive filtering of the displayed image samples.

Additionally, a discrete pixel display, such as an LCD, operates by utilizing a sample-and-hold technique. The characteristic of the image is sampled, then applied to the components forming the pixel. This characteristic of the image is applied for the entire extent of the pixel. As is well known in the art of sampling, the frequency response of a sample-and-hold device results in an attenuation of the original signal which increases with frequency. That is, the sample-and-hold characteristic of a conventional discrete pixel display introduces an undesirable attenuation of the original image, particularly at the higher frequencies.

SUMMARY OF THE INVENTION

It is an object of this invention to provide for the pixel based display of a video image without introducing artifacts which are not present in the original image. It is a further object of this invention to provide effective filtering of the video image so as to minimize the high frequency artifacts caused by the discrete nature of the sampled video image. It is a further object of the invention to pre-filter the video image to compensate for the non-uniform frequency response caused by the discrete display of a video image.

A fine detail in an image produces a high frequency change in the video representation of this image. If the image has very fine detail, and the encoding means is sufficient to capture this fine detail, the resultant video representation will contain high frequency components in the luminance and/or chromatic signals comprising this representation. As discussed above, the partitioning of an image into pixels is a form of sampling. This sampling may be the result of the formation of the image as a series of spaced apart dots, or, more specifically, by the assignment of a particular, sampled, value to each of the addressable pixels in a discrete display device.

As is well known in the art of signal sampling, the sampling of a signal at less than its Nyquist rate results in aliasing. A high frequency signal which is sampled at less than twice its frequency will necessarily result in the production of undesirable lower frequency signals, signals which are not contained in the original sampled signal. The first object of this invention is achieved by filtering the video image prior to display, in dependence on the sampling characteristics of the display, to eliminate the effects caused by aliasing.

As is also well known in the art of sampling, for a signal sampled at or above its Nyquist rate, the proper reconstruction of an original signal from its sampled values requires a low-pass filtering of the samples. This low-pass filtering is required to remove the high frequency signals introduced by the convolution of the original signal and the visual sampling function. Because these high frequency signals are introduced by the visual display of the discrete pixels, the low-pass filtering to remove these harmonics must occur after the display of the discrete pixels. The second object of this invention is achieved by optically filtering the video samples, to remove the high frequency harmonics not contained in the original image.

Further objects of the invention are achieved by a customization of the filter characteristics of the filtering which is to occur prior to the display of the image in dependence upon the characteristics of the content of the pixel images, as well as the optical filter characteristics of the display device.

DETAILED DESCRIPTION OF THE PREFERRED EMBODIMENTS

Figure 1:
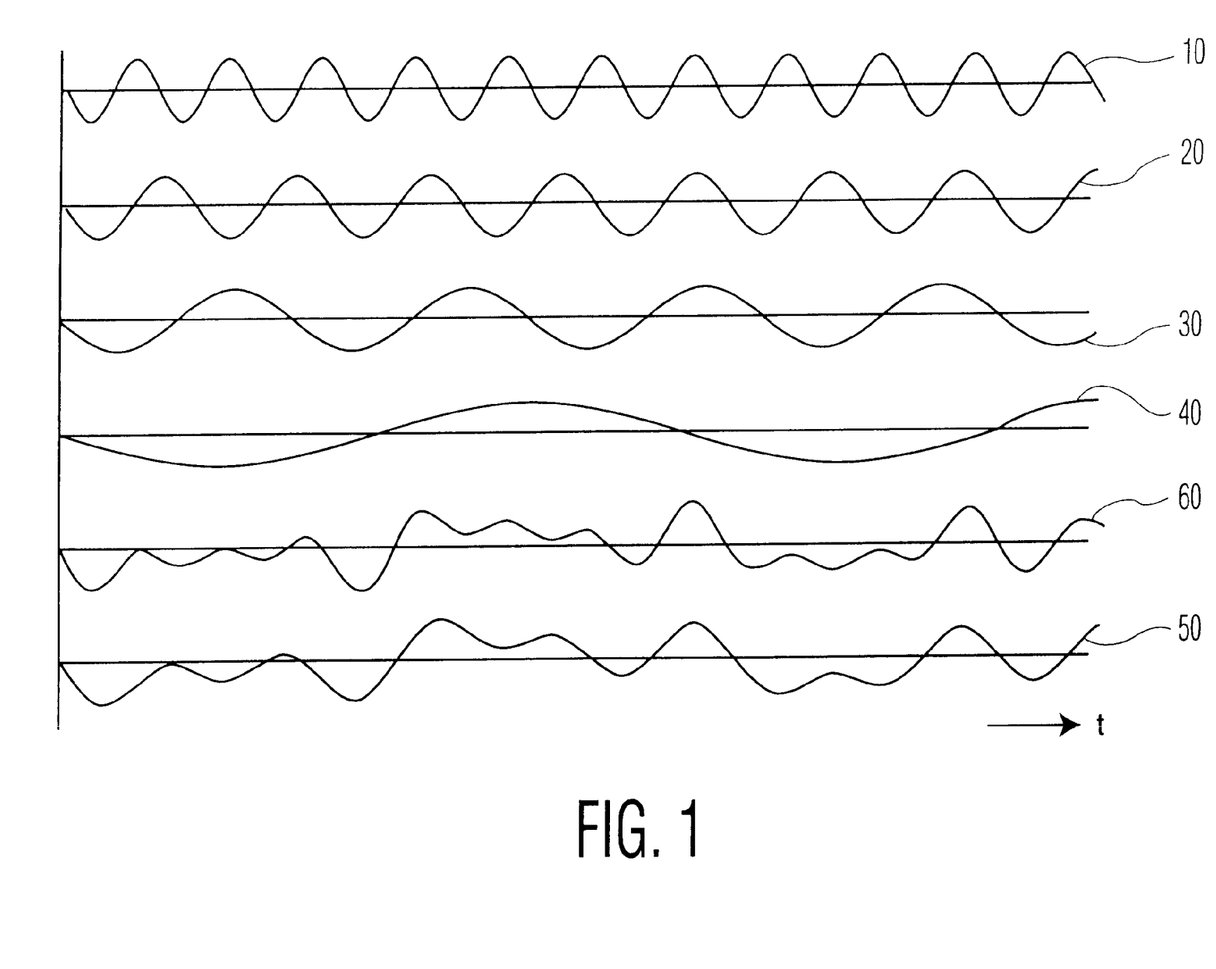
FIG. 1 shows two composite signals; the first composite contains four sinusoidal components, and the second composite is the first composite sans the highest frequency component.

FIG. 1 shows a baseband signal 60 containing a composite of sinusoidal signals 10, 20, 30, and 40. Also shown is baseband signal 50, which is a composite of signals 20, 30, and 40. That is, signal 50 represents baseband signal 60 without the high frequency component 10. In a conventional display system, if signal 60 represents the encoding of the original image, then signal 60 would be presented to the display device, independent of the device's inherent ability to accurately display signal 60. For example, if signal 60 represents the luminance of the red components in the original image, then signal 60 would form the drive signal for the red electron gun in a color television system, without explicit regard for the spacing of the pixels on the display. Or, in a computer display, the analog signal 60 would be sampled by a sampling Analog-to Digital (A/D) converter, to load the video memory with a value for each pixel, again, without regard for the frequency makeup of signal 60 as compared to the sampling rate of the A/D converter.

It is a premise of this invention that if the image contains higher frequency signals than can be accurately displayed, these signals should be specifically eliminated, rather than merely suppressed by the operation of insufficient sampling by the display. That is, if it is known, by the inherent characteristics of the display, that the high frequency component 10 of signal 60 cannot be adequately reproduced, then, in accordance with this invention, signal 50 should be presented to the display, not signal 60. A device constructed in accordance with this invention will eliminate all components of the signal whose frequencies exceed the device's ability to display these components, rather than producing a distorted version of these high frequency signals, and their adverse side effects.

Figure 2A:
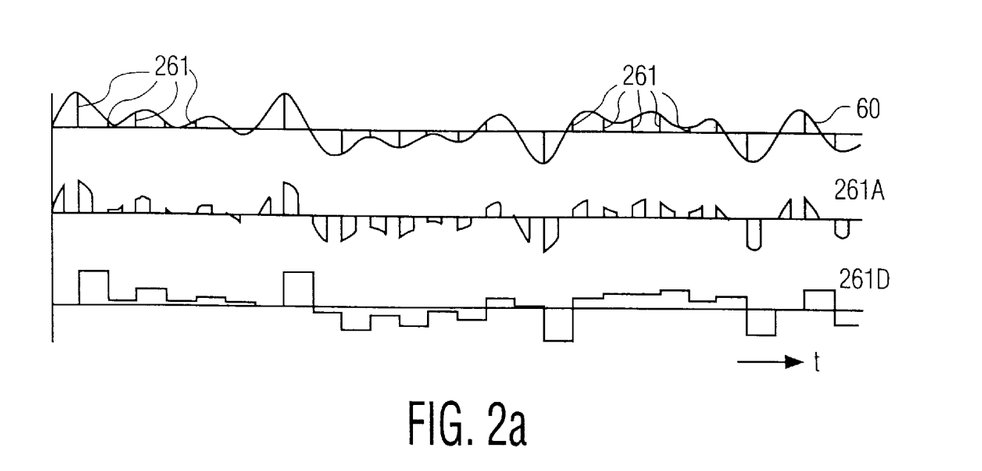
FIGS. 2a–2d show the sampling of two composite signals, in the time domain, at two sampling frequencies, and the resultant analog and discrete display signals.
Figure 2B:
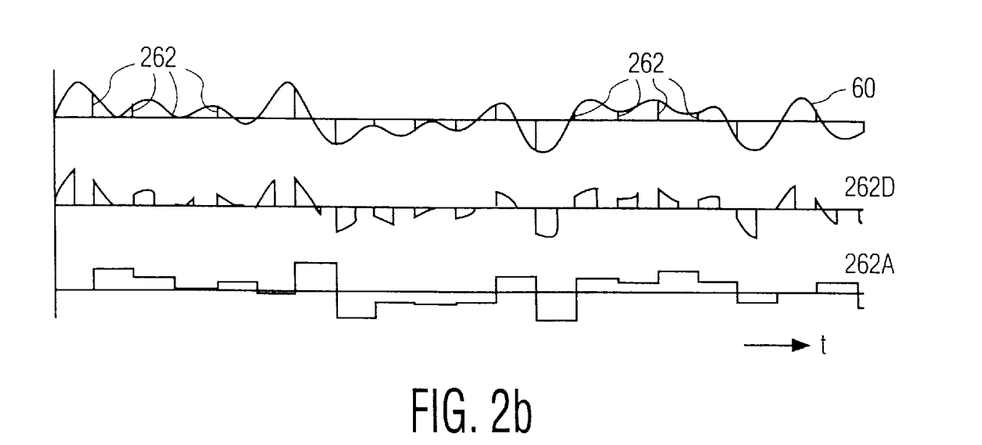
Figure 2C:
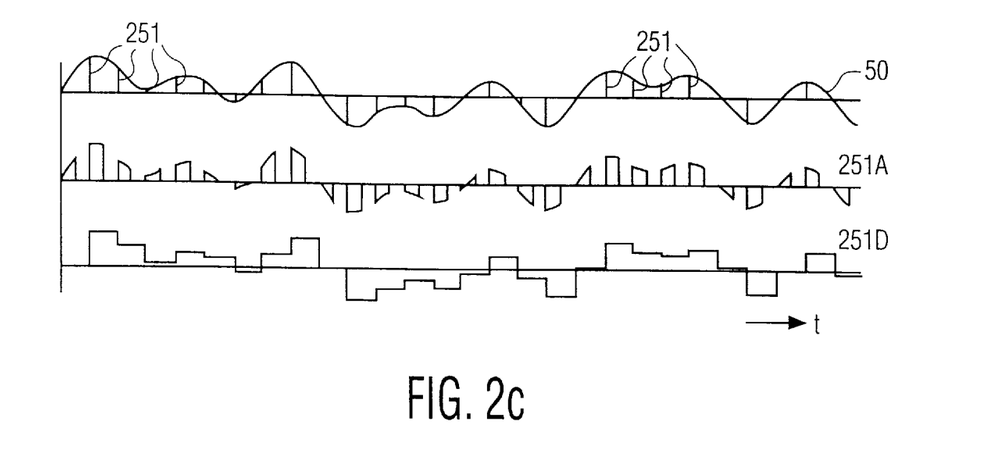
Figure 2D:
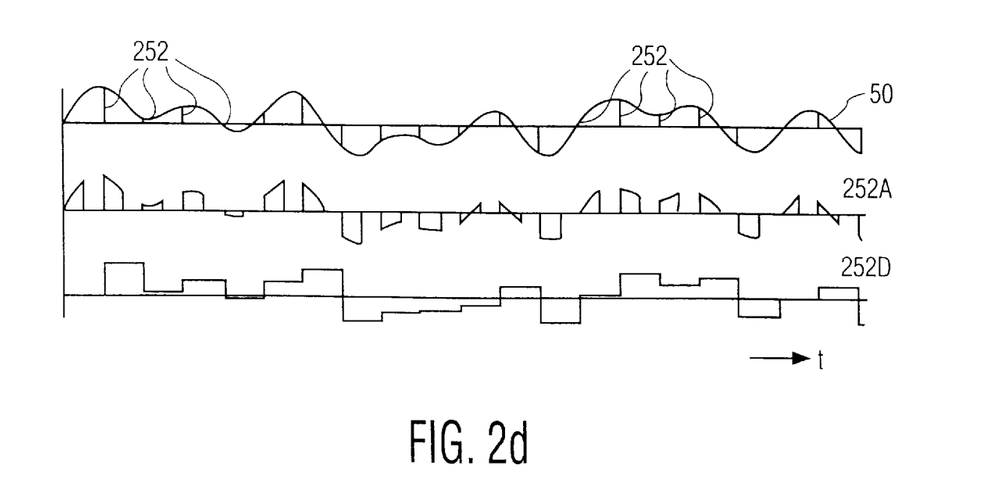

FIGS. 2a and 2b shows the sampling of signal 60 at two sampling frequencies; FIGS. 2c and 2d shows the sampling of signal 50 at these same sampling frequencies. FIG. 2a shows the sampling of signal 60 at a sampling rate above its Nyquist rate. FIG. 2b shows the sampling of signal 60 at a sampling rate below its Nyquist rate. The two sampling rates are each above the Nyquist rate of signal 50.

In FIG. 2a, impulse pulses 261 are the impulse sample values of baseband signal 60 at sampling frequency S1.

Signal 261A is the displayed sampled signals on an analog display, such as a CRT, and signal 261D is the displayed sampled signals on a discrete display, such as an LCD. The analog display is assumed to provide for a 50 percent duty cycle, such that the signal is displayed as it exists for half the time, while the electron, for example, travels through the aperture of a color dot, and is obstructed between apertures. The discrete display, on the other hand, is assumed to present the sampled value for the entire spatial duration of the pixel. As is common in the art, a displayed image may be a combination of these two sampling techniques; for example, the pixel of a discrete display may also be obstructed for a portion of its spatial duration. Or, a computer system may quantize an image into discrete pixels, then display these discrete pixels on an analog display.

In FIG. 2b, impulse pulses 262 are the impulse sample values of baseband signal 60 at sampling frequency S2. Signals 262A and 262D are the displayed sampled signals on an analog display and a discrete display, respectively. Similarly, in FIGS. 2c and 2d, impulse pulses 251 and 252 are the impulse sample values of baseband signal 50 at sampling frequencies S1 and S2, respectively, and 251A, 252A, and 251D, 252D, are the respective displayed sampled signals on an analog display and a discrete display.

Each of these displayed sampled signals, 261A, 262A, 261D, 262D, 251A, 252A, 251D, and 252D, appears to be a significant distortion of their respective original baseband signals 60 and 50. However, suitable low-pass filtering can be applied to the sampled signals to reconstruct the original baseband signals, provided the sampled signals conform to the Nyquist criteria, i.e., the sampling of the baseband signal must occur at or above twice the highest frequency contained in the baseband signal for the baseband signal to be accurately reproduced.

FIGS. 3a–3d show the frequency spectrum associated with the impulse sampling of baseband signals 60 and 50 at sampling frequencies S1 and S2. Shown in dashed lines are the convolutions 216, 215 and 226, 225 of the baseband signals 60 and 50 about sampling frequencies S1 and S2, respectively, and about the harmonics of these sampling frequencies.

Figure 3A:
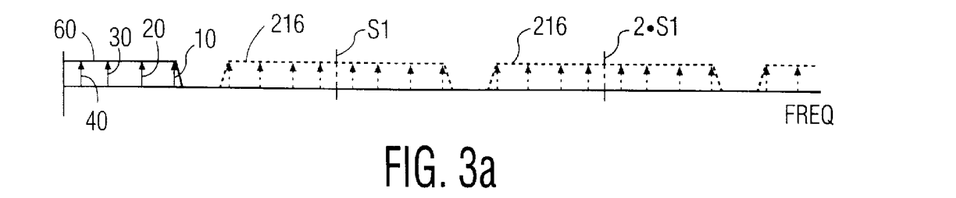
FIGS. 3a–3d show the sampling of two composite signals, in the frequency domain, at two sampling frequencies.
Figure 3B:
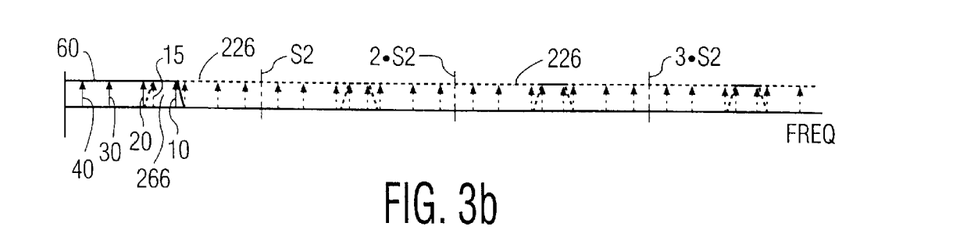

As can be seen in FIG. 3b, the sampling of baseband signal 60 at sampling frequency S2, below twice the highest frequency of baseband signal 60, produces convoluted components 266 which lie within the frequency range of baseband signal 60. These components, which lie within the original baseband, are termed aliased components. The convolution of the original high frequency component 10 of baseband signal 60 at the sampling frequency S2 produces an aliased component 15, whose frequency lies within the frequency range of the baseband signal.

Figure 3C:
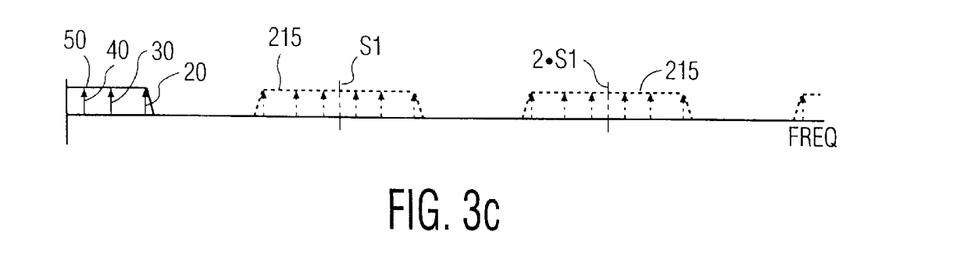
Figure 3D:
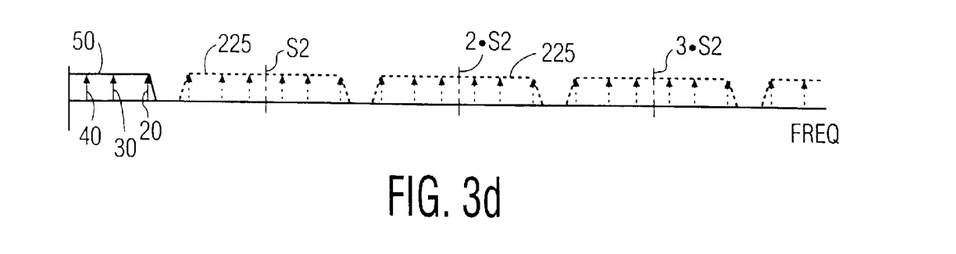

If a low-pass filter with a cutoff frequency just above the highest frequency of the baseband signal is applied to the signals shown in FIGS. 3a, 3c, and 3d, the original baseband signal can be recovered. With regard to FIG. 3b, however, a reconstruction of the original signal 60 from the components within the original baseband frequency range will, necessarily, result in the construction of signal 15. Signal 15 is within the original baseband frequency range, but not within the original signal. This aliased component 15 cannot be eliminated by a conventional low-pass filter with a cutoff frequency just above the baseband signal. If signal 60 represents an audio signal, this convoluted component 15 would be heard as a tone which was not in the original audio signal; if signal 60 represents a video signal, this aliased component 15 would represent a changing luminance or chrominance which was not in the original video signal.

Figure 8:
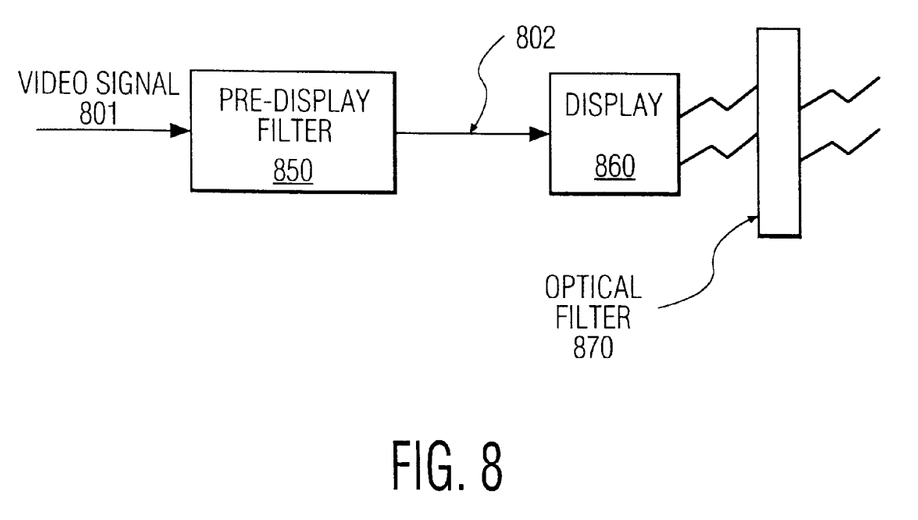
FIG. 8 is a block diagram of a display system, showing an anti-aliasing pre-filter and post-display optical filter in accordance with this invention.

As stated above, the premise of this invention is that it is preferable to accurately portray the displayable frequency components, rather than introduce aliased components. That is, it is preferable to remove, by pre-filtering, all frequency components in a video image having a Nyquist rate higher than the video display's effective sampling rate. As discussed further, FIG. 8 shows a display device having a pre-filter 850 designed to eliminate all components of the video image having a Nyquist rate which is beyond the effective sampling rate of the display device. Although this filter may remove some of the finer detail in the image, the operation of this filter will assure that the displayed image does not contain visual artifacts which are not present in the original image.

Merely providing for sufficient sampling, however, is not sufficient to accurately recreate the original image. As noted above, with regard to properly sampled signals, such as signals 261, 251, and 252 in FIGS. 2a, 2c and 2d, an accurate reconstruction of the original signal from its sampled values requires smoothing, via a low-pass filter.

Figure 4:
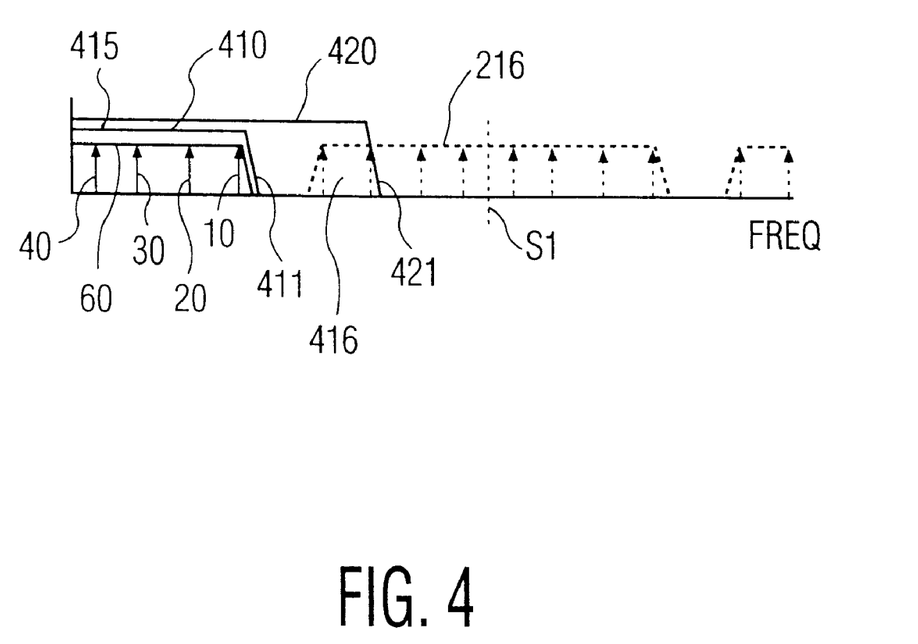
FIG. 4 shows the frequency spectrum of a signal sampled above its Nyquist rate, the frequency response of a filter having a flat response and a proper cutoff frequency in accordance with this invention, and the frequency response of a filter having too high a cutoff frequency.

FIG. 4 shows the frequency spectrum for an appropriately sampled signal, comprised of the original baseband signal 60 and its convoluted components within 216 about the sampling frequency S1. Also shown is the frequency response 410 of a low-pass filter. Of particular note is the cutoff frequency 411, and the flat response across the baseband shown at 415. A filter having a cutoff at 411 will eliminate all components with frequencies above this cutoff value, and, in particular, all of the convoluted components within 216. The flat response 415 assures an accurate reproduction of the original signal 60.

In the video realm, because of a human being's inability to distinguish individual sampled values, some low-pass filtering will occur. But, the human eye's ability to distinguish detail typically exceeds the resolution of a display device. That is, the human eye's high frequency cutoff is not low enough to properly segregate the baseband signal 60, because portions of the convoluted components within 216 will be visible.

FIG. 4 shows the frequency response 420 of a filter having a cutoff frequency 421 above the baseband frequency range. The convoluted frequency components 416 which are below the cutoff frequency 421 will not be eliminated by the filter having the frequency response 420. If signal 60 represents the original video image, and filter having the frequency response 420 represents the filtering produced by the physics of a display and the human visual system, then the perceived image will consist of the original image plus these convoluted frequency components 416 manifested as high frequency luminance or chrominance 416 which are not present in the original image.

In accordance with this invention, because the original image cannot be accurately reproduced without a low-pass filtering of the discrete video images of each pixel, an optical filter, having the appropriate high frequency cutoff is required.

The preferred optical filter will have the frequency characteristics as shown in FIG. 4 at 410. Desirably, the filter will have a cutoff frequency 411 below the convoluted components within 216, and a flat response 415 within the baseband of the original video image 60. In today's technology, however, optical filters cannot currently be designed as precisely as shown by filter response 410. A common optical filter lens will produce a cosine filter response, with zeros at frequencies dependent upon the thickness of the lens. Classical filter design techniques can be employed to cascade multiple cosine filters (lens of different thicknesses) to form more complex filters having a more desirable overall frequency response. In general, however, there is a practical and economic limit to the degree of cascading which can be accomplished, and the optical filter response will only approximate the ideal characteristics shown in FIG. 4 at 410.

Figure 5A:
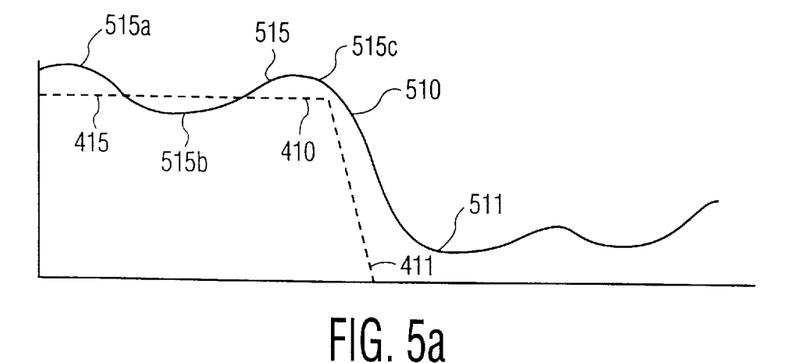
FIGS. 5a–5d show the filter characteristics of a conventional optical filter, and its inverse, for the design of a prefilter to compensate for these characteristics. Also shown is a sample-and-hold sin(x)/x frequency response, and a preferred inverse sin(x)/x filter response in accordance with this invention.

FIG. 5a shows the frequency response 510 of a non-ideal optical filter, contrasted with the ideal frequency response 410 of FIG. 4. As can be seen, at 515, the filter does not have the flat frequency response corresponding to the ideal at 415. Also, at 511, the filter does not have a sharp high frequency cutoff corresponding to the ideal at 411. The non-flat response will introduce distortions; frequency components at 515b, for example, will be attenuated compared to those at 515a and 515c. Depending upon the choice of where the cutoff frequency is to lie, relative to the baseband signal and the convoluted frequency components 416, the lack of a sharp cutoff will result in either the original signal being significantly attenuated at the higher frequency near the cutoff, or, the convoluted signals not being significantly attenuated near the cutoff. That is, the lack of a sharp cutoff will either introduce non-uniform attenuation of the original image, or will allow the eye to see the high frequency signals introduced by the display sampling process.

Figure 5B:
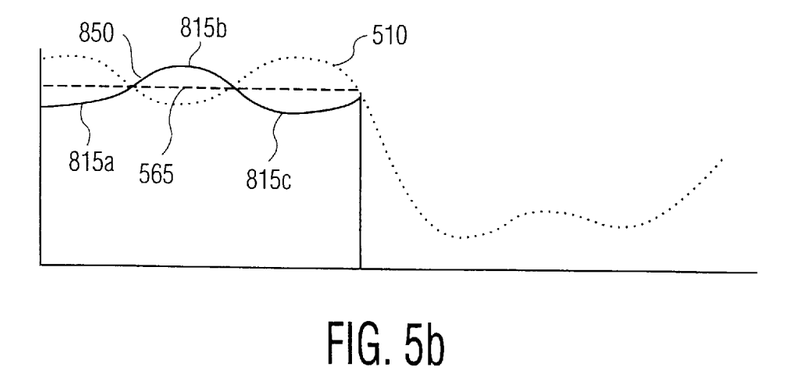

In accordance with this invention, the pre-filter 850 of FIG. 8 can be modified to produce the complement of the characteristics of the optical filter in the region 515. That is, it can be modified to de-emphasize the frequency components of the image corresponding to 515a and 515c, and emphasize the frequency components of the image corresponding to the frequencies at 515b, as shown in FIG. 5b, at 815a–815c. The combination of these filtering effects will result in a flat frequency response 565 across the baseband of signal 60, as shown in FIG. 5b.

It is to be noted that optical filters may not necessarily have equivalent filter characteristics in each axis. In accordance with this invention, the pre-display filter 850 can be designed to apply different filtering to the vertical and horizontal components of the video signal to effect the aforementioned complement of the optical characteristics in each axis.

Figure 5C:
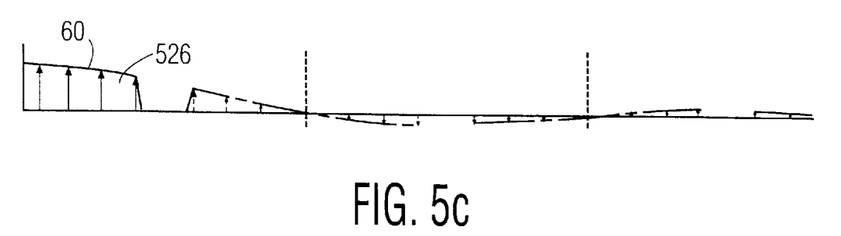
Figure 5D:
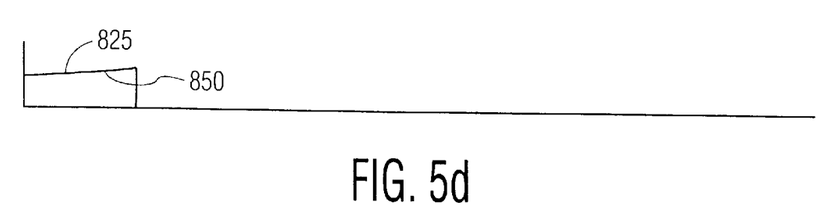

Thus far, the sampling phenomenon has been discussed in an idealized manner. The convolutions presented are based upon an idealized impulse sampling being applied to the baseband signal. The sampling effects produced by a pixel-based display, however, are not the effects of an ideal impulse sampling. In the discrete pixel-based system, such as an LCD, the video is sampled, and held at a constant value for the entire width, or spatial duration, of the pixel, as shown in FIGS. 2a–2d, signals 261D, 262D, 251D, and 252D. As is known in the art, the frequency response of a sample-and-hold device has a $(\sin(x))/x$ response. That is, the output of a sample and hold device will produce the convoluted frequency response as shown in FIG. 5c. As can be seen, the high frequency components 526 of the baseband of signal 60 are attenuated. In accordance with this invention, the filter characteristics of the pre-filter 850, shown in FIG. 5d, can be designed so as to counteract this attenuation, by emphasizing the high frequency components of the video image, as shown at 825, to produce a flat frequency response across the baseband signal 60. As is apparent to one skilled in the art, this $\sin(x)/x$ correction can be applied in conjunction with the inverse filtering discussed above, with regard to the optical characteristics of the display.

The convoluted frequency components 416, caused by the display sampling, however, cannot be compensated for in the pre-filter 850. These high frequency signals are produced by the convolution of the original signal about the spatial frequency of the video display. Given a display having a particular spatial frequency, the only way to reduce the extent of this convolution is to reduce the extent of the baseband signals. If the baseband range is reduced, relative to the effective sampling rate of the display, the components of the convoluted frequency components 416 which lie below the cutoff frequency 511 of the optical filter will be reduced.

Figure 6:
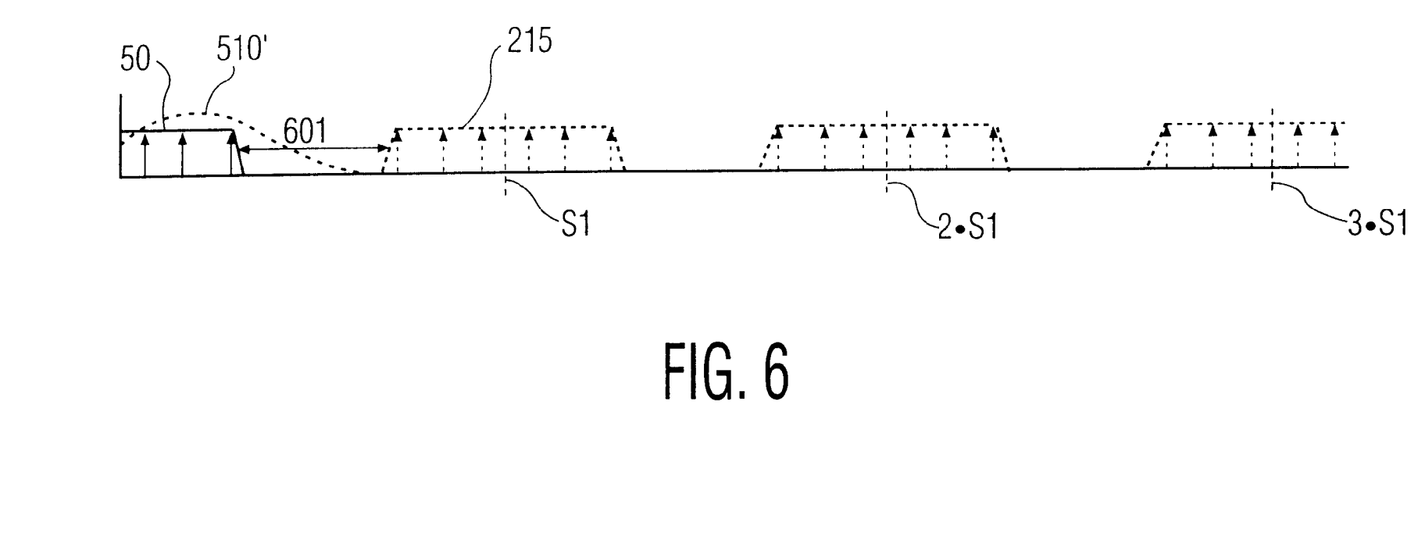
FIG. 6 shows the sampling spectrum when the prefilter is set well below the Nyquist rate of the display, in accordance with this invention.

FIG. 6 shows the sampling of a baseband signal 50 with a sampling signal whose sampling frequency, S1, is significantly higher than twice the highest frequency component 20 within the baseband signal 50. A large gap 601 is evident between the baseband signal 50 and the convolution 215 about S1. That is, the sampling of signal 50 at this high frequency S1 will not produce any high frequency components within this gap 601. Thereafter, due the lack of a sharp cutoff frequency, the bandpass of the optical filter characteristics 510' can extend well into this area without producing any undesirable side effects. Thus, a further aspect of this invention is the design of pre-filter 850 such that the high frequency components of the original signal are filtered so as to provide for a large gap between the baseband signal and the convoluted signals about the first harmonic of the sampling signal. Note that this enhancement can be applied absent an explicit optical filter being added to the display. As mentioned above, the physical characteristics of the display, in conjunction with the human visual system, will produce some low-pass filtering of the displayed image. The optical characteristics as shown by the response curve 510' is presented for demonstrative purposes only; the actual response will be a function of the aforementioned optical filter and/or the human visual system. By providing for a gap between the baseband and the convoluted signals, fewer convoluted signals will be presented to the human visual system. That is, in accordance with this invention, by pre-filtering the video image to well below half the sampling frequency of the display, fewer luminance and chromatic changes which were not in the original image, will be presented to the human visual system. Although this extensive pre-filtering will limit some of the finer details which may have been contained in the original image, it will, more importantly, limit the display of details which were not contained in the original image.

In accordance with this invention, the prefiltering of the video image and the optical filtering of the displayed image should be designed in dependence upon the sampling characteristics of the display. These sampling characteristics are dependent upon such factors as the size and spacing of the individual pixels, as well as the nature of the image displayed within each of these pixels. The spacing of the pixels can be characterized by a spatial frequency, such as dots per inch, pixels per line, pixels per horizontal or vertical extent, etc. Similarly, the amount of detail contained in an image can be characterized by the frequency of changes within the image, such as changes per inch, changes per line, changes per horizontal or vertical extent, etc. As discussed above, optical filters may be characterized in cycles per line. In broadcast television, the amount of detail which can be presented is presented in terms of changes, or cycles, per second, because, in a scanned system, time is directly proportional to the spatial dimension of the scan. Similarly, the spatial frequency of a television display may also be expressed in cycles per second. In a computer system, the amount of detail which can be presented is expressed as the number of addressable points in an image in the horizontal and vertical dimensions. The spatial frequency of a computer display is typically expressed as the inverse term, dot-pitch, the distance between the nominal center of adjacent pixels, from which the dots per horizontal or vertical extent can be determined by knowing the physical size of the computer display.

As is apparent to one skilled in the art, the various terms used to characterize the amount of detail contained within an image and to characterize the ability of a device to display an image, can be transformed to a common set of units. For ease of understanding, and without any loss of generality, a device's spatial frequency will be discussed herein in terms of pixels per line, and an image's degree of detail will be discussed herein in terms of cycles per line, wherein a cycle is one period of a sinusoidal change of a parameter of the image, such as its luminance. A finely detailed image will have a high frequency of change of luminance, expressed as a high number of cycles per line. The extent of the frequencies within the image is termed herein as its bandwidth. An image's bandwidth is equal to the highest frequency component contained in that image.

As presented above, to be able to accurately recover a signal from a sampling of its values, the sampling must occur at or above twice the frequency of the highest frequency component contained in that signal. In the terminology presented above, the spatial frequency of the display must be at least twice the bandwidth of the image to be displayed. Because the spatial frequency of the display is fixed, this requirement is better expressed as: the bandwidth of the image to be displayed must be less than half the spatial frequency of the device.

Consider, for example, a nominal 15" wide, 0.39 mm dot-pitch display. This display has a spatial frequency of approximately 1000 pixels per line. Therefore, in accordance with one aspect of this invention, the pre-filter 850 should filter any image to be displayed on this display to less than 500 cycles per line. A smaller display, for example 9" wide, having the same 0.39 mm dot-pitch, would have a spatial frequency of approximately 600 pixels per line, and the pre-filter 850 should filter any image to be displayed on this display to less than 300 cycles per line. Thus, as can be seen, the characteristics of the pre-filter 850 are determined in dependence upon the characteristics of the display, such as its size, as well as its pixel spacings.

In the same way, consider a 15" wide color television having a 0.8 mm dot-pitch, and thereby having a spatial resolution of 480 pixels per line. The pre-filter 850 should limit the image to be displayed to 240 cycles per line. Each horizontal line on an NTSC television consumes about 60 microseconds. Therefore, the horizontal bandwidth of the image should be limited to 4 MHz (240÷0.00006). On a 9" wide NTSC color television, the horizontal bandwidth should be limited to 2.4 MHz.

Figure 7A:
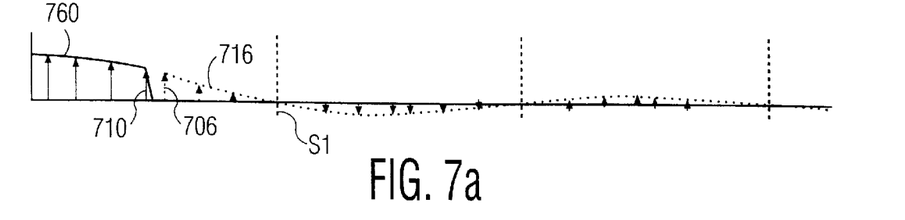
FIGS. 7a–7f show the frequency response of a sample-and-hold sampling display and the frequency response of a continuous sampling display.
Figure 7B:
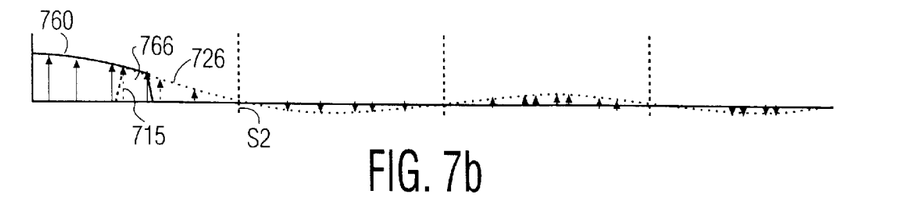

It should be noted, however, that the need to enforce this image bandwidth constraint is more pronounced on a discrete pixel-based display, such as an LCD, than it is on a conventional analog display, such as a CRT. As noted above, the discrete display utilizes a sample-and-hold technique. A sample of the image's value, such as the magnitude of its red component, is sampled; this sampled value is applied to the pixel. The entire width of the pixel will contain this same sampled value. That is, spatially, the value is held at the sampled value until the next sample is produced. This produces the convolutions shown in FIG. 7a. As can be seen, the magnitude of the convoluted components 706 near the upper frequency of the baseband image are of the same order of magnitude as the original components 710 at these upper frequencies, and the magnitudes decrease with increasing frequency. Thus, even with sampling at the Nyquist rate, interference caused by the sample-and-hold technique can be significant. Further, as shown in FIG. 7b, if the convolution 726 extends into the baseband 760, because of an insufficient spatial sampling frequency, the aliased convoluted components 766 will be at a lower frequency than the original baseband components which caused them. The convoluted component 715 will, thus, be more visually apparent than the original component 710 which produced this convolution.

Figure 7C:
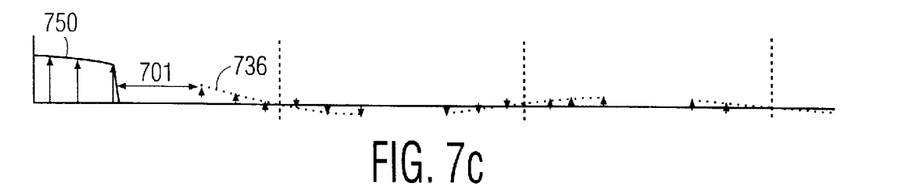
Figure 7D:
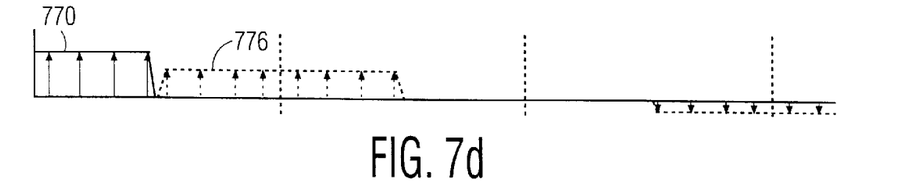
Figure 7E:
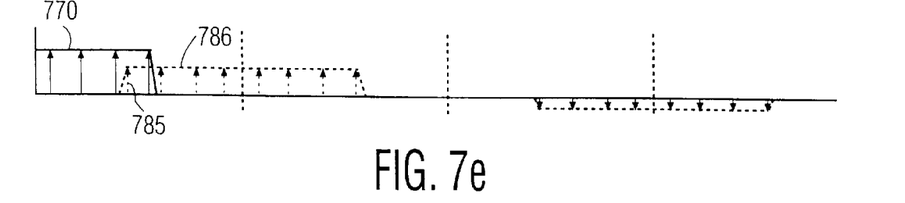
Figure 7F:
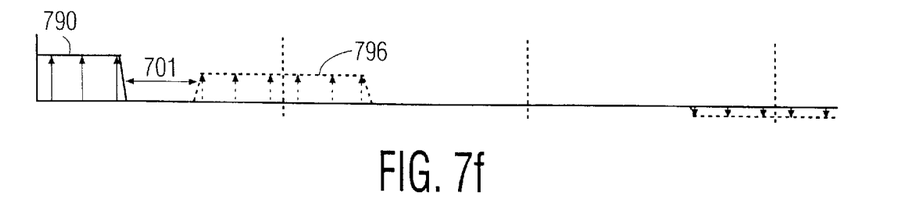

An analog display, for example, a color CRT, utilizes a continuous sample technique. Each dot results in a sampling of the image, but within the dot, the value is not fixed, as shown in FIGS. 2a–2d, i.e., 261A, 262A, 251A, and 252A. Thus, if the red signal is changing, this changing value will be displayed across the spatial duration of the red dot. This sampling produces convolutions whose magnitudes are a function of the percentage of spatial duration that the image is being continuously displayed; that is, by the ratio of the dot aperture size to the dot-pitch. FIGS. 7d–7f show the convolutions produced by a color CRT having a dot aperture equal to half the dot-pitch, as may be typical of conventional televisions. In FIGS. 7a–7e, note that the convoluted signals 776 are reduced in magnitude by about one half, compared to the baseband signals 770. Note also that, as compared to the discrete sample-and-hold technique, the high frequency components of the original signal are not attenuated. Thus, on an analog CRT, the original image is preserved, and the convoluted components, albeit present, will be significantly less apparent than the original components which produced them. If the baseband signal 770 is insufficiently sampled, as shown in FIG. 7e, the aliased component 785 will be less visible than the original components of 770.

As discussed above, in accordance with a further aspect of this invention, the baseband image should be limited beyond the above limit of half the spatial frequency of the display. As is evident from FIG. 7a, the convoluted signals produced by a sample-and-hold device, such as an LCD, are of comparable magnitude to the displayed baseband signals. Also as shown in FIGS. 7a–7c, the magnitude of these convoluted signals decrease with increasing frequency. By providing for a significant gap between the baseband signals and the convoluted signals, a significant decrease in the magnitude of the convoluted signals, compared to the baseband signals, can be achieved, as shown in FIG. 7c, wherein the magnitude of the convoluted signals 736 are significantly smaller that the signals forming the baseband signal 750. In accordance with this invention, the pre-filtering of the video signals should preferably limit the baseband signal to not more than one third the spatial frequency of the display device, particularly if the device operates as a sample-and-hold device.

Also shown, in FIG. 7f, is the frequency spectrum of a continuous sampled display in which the image bandwidth is limited to a third of the display's spatial frequency, and the aperture of the pixel is equal to half the distance between pixels. As can be seen, the magnitude of the convoluted signals is not reduced, as in the case of a sample-and-hold display, but the gap will allow for the use of an optical filter having a higher frequency cutoff. As previously mentioned, a decrease in the magnitude of the convoluted signals can be achieved by increasing the relative size of the pixel aperture.

FIG. 8 shows a display device in accordance with this invention. A video signal 801 is pre-filtered by the pre-display filter 850, whose characteristics are dependent upon the sampling phenomena introduced by the pixel display of the image via the display 860. The filtered output 802 is applied to the display 860 to produce an image from this filtered output. In accordance with the second aspect of this invention, the output from the display is optically filtered by an optical low-pass filter 870, to filter the high frequency components introduced by the pixel-based display of the image. The optical filter may be in the form of a lens in a projection display system, or a characteristic of the surface upon which the image is projected, or a film on the surface of a CRT or LCD, or a characteristic of the CRT of LCD surface components.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A display device for displaying a visual image, said device comprising:

means for filtering an input electrical video signal to produce a filtered electrical video signal, said input electrical video signal including signal components each having a component frequency, and means for producing a visual optical image from the filtered electrical video signal, said means for producing the visual optical image being such that the visual optical image is formed as an array of individual picture elements, said picture elements being arrayed so as to have a characteristic spatial frequency, wherein said means for filtering the electrical video signal operates in dependence upon the characteristic spatial frequency of the array of picture elements, and substantially attenuates components having component frequencies above a pre-filter cutoff frequency.

2. The display device as claimed in claim 1, wherein said display device further comprises:

means for optically filtering the visual optical image.

3. The display device as claimed in claim 2, wherein said means for optically filtering the visual optical image operates in dependence upon the characteristic spatial frequency of the array of picture elements.

4. The display device as claimed in claim 2, wherein said means for optically filtering the visual optical image has a characteristic optical filter response, and said means for filtering the input electrical video signal is further dependent upon said characteristic optical filter response.

5. The display device as claimed in claim 4, wherein said means for producing the visual optical image has a characteristic sampling response, and said means for filtering the input electrical video signal is further dependent upon said characteristic sampling response.

6. The display device as claimed in claim 1, wherein said means for producing the visual optical image has a characteristic sampling response, and said means for filtering the input electrical video signal is further dependent upon said characteristic sampling response.

7. The display device as in claim 1, wherein said pre-filter cutoff frequency is at or below half the spatial frequency of the array of picture elements.

8. The display device as in claim 1, wherein said pre-filter cutoff frequency is at or below one-third of the spatial frequency of the array of picture elements.

9. A display device for displaying a visual image, said device comprising:

means for filtering an input electrical video signal to produce a filtered electrical video signal; and means for producing a visual optical image from the filtered electrical video signal, said means for producing the visual optical image being such that the visual optical image is formed as an array of individual picture elements, said picture elements being arrayed so as to have a characteristic spatial frequency, wherein said means for filtering the input electrical video signal operates in dependence upon the characteristic spatial frequency of the array of picture elements, and operates as an inverse $(\sin(x)/x)$ filter.

10. A display device for displaying a visual image, said device comprising:

means for filtering an input electrical video signal to produce a filtered electrical video signal;

means for producing a visual optical image from the filtered electrical video signal, said means for producing the visual optical image being such that the visual optical image is formed as an array of individual picture elements, said picture elements being arrayed so as to have a characteristic spatial frequency; and means for optically filtering the visual optical image, wherein:

said means for filtering the electrical video signal operates in dependence upon the characteristic spatial frequency of the array of picture elements;

said means for producing the visual optical image also produces high frequency signals not contained in the filtered electrical video signal; and said means for optically filtering the visual optical image substantially attenuates these high frequency signals.

11. A method for producing an optical image from an input electrical video signal, said input electrical video signal including signal components each having a component frequency, comprising the steps:

filtering the electrical video signal to produce a filtered electrical video signal, in dependence upon a characteristic spatial frequency of a display device for displaying the electrical video signal as an optical array of pixel element to produce an optical pixel image, said filtering of the electrical video signal comprises substantially attenuating the signal components having a component frequency above a cutoff frequency, said cutoff frequency being dependent upon the characteristic spatial frequency of the optical pixel image; and displaying the filtered electrical video signal on said display device.

12. The method for producing an optical image as in claim 1, wherein said method further comprises the step:

optically filtering the optical pixel image in dependence upon the characteristic spatial frequency to produce a filtered optical pixel image.

13. The method as in claim 11, wherein said cutoff frequency is less than or equal to one-half the characteristic spatial frequency of the optical pixel image.

* * * * *